US012792245B2

(12) United States Patent
Tharanath et al.

(10) Patent No.: US 12,792,245 B2
(45) Date of Patent: Nov. 10, 2026

(54) GARBAGE COLLECTION BASED ON DATA CHARACTERISTICS

(71) Applicant: Micron Technology, Inc., Boise, ID (US)

(72) Inventors: Pranav Tharanath, Bangalore (IN); Akil M, Bangalore (IN); Amiya Banerjee, Bangalore (IN); Sriraman Sridharan, Hosur (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/234,209

(22) Filed: Jun. 10, 2025

(65) Prior Publication Data

US 2025/0383806 A1 Dec. 18, 2025

Related U.S. Application Data

(60) Provisional application No. 63/660,272, filed on Jun. 14, 2024.

(51) Int. Cl.
*G06F 3/06* (2006.01)

(52) U.S. Cl.
CPC ............ *G06F 3/064* (2013.01); *G06F 3/0611* (2013.01); *G06F 3/0632* (2013.01); *G06F 3/0673* (2013.01)

(58) Field of Classification Search
CPC ...... G06F 3/064; G06F 3/0673; G06F 3/0611; G06F 3/0632
See application file for complete search history.

(56) References Cited

U.S. PATENT DOCUMENTS

| | | | | |
|---|---|---|---|---|
| 11,010,291 | B2 * | 5/2021 | Yen | G06F 11/1048 |
| 11,042,307 | B1 * | 6/2021 | Li | G06F 3/064 |
| 12,359,978 | B2 * | 7/2025 | Palmer | G01K 1/022 |
| 2017/0168929 | A1 * | 6/2017 | Kanno | G06F 12/0246 |
| 2019/0056888 | A1 * | 2/2019 | Kwon | G06F 3/0659 |
| 2019/0196963 | A1 * | 6/2019 | Byun | G06F 12/0246 |
| 2021/0216474 | A1 * | 7/2021 | Muchherla | G06F 12/0253 |

* cited by examiner

*Primary Examiner* — Mark A Giardino, Jr.
(74) *Attorney, Agent, or Firm* — Holland & Hart LLP

(57) ABSTRACT

Methods, systems, and devices for garbage collection based on data characteristics are described. A memory system may receive a write command associated with a first logical block address (LBA) of a virtual block of the memory system, where the virtual block may be associated with a first value indicating a version of the virtual block. The memory system may adjust a value of a first counter within a mapping table in response to a difference between the first value and a second value satisfying a first threshold value. The second value may indicate a quantity of opened virtual blocks. The memory system may determine whether the value of the first counter satisfies a second threshold value, and transfer as part of garbage collection, data associated with the virtual block to a second virtual block in response to the value of the first counter satisfying the second threshold value.

22 Claims, 6 Drawing Sheets

GARBAGE COLLECTION BASED ON DATA CHARACTERISTICS

CROSS REFERENCE

The present application for patent claims priority to U.S. Patent Application No. 63/660,272 by Tharanath et al., entitled "GARBAGE COLLECTION BASED ON DATA CHARACTERISTICS," filed Jun. 14, 2024, which is assigned to the assignee hereof, and which is expressly incorporated by reference in its entirety herein.

TECHNICAL FIELD

The following relates to one or more systems for memory, including garbage collection based on data characteristics.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states in response to being disconnected from an external power source.

DETAILED DESCRIPTION

Figure 1:
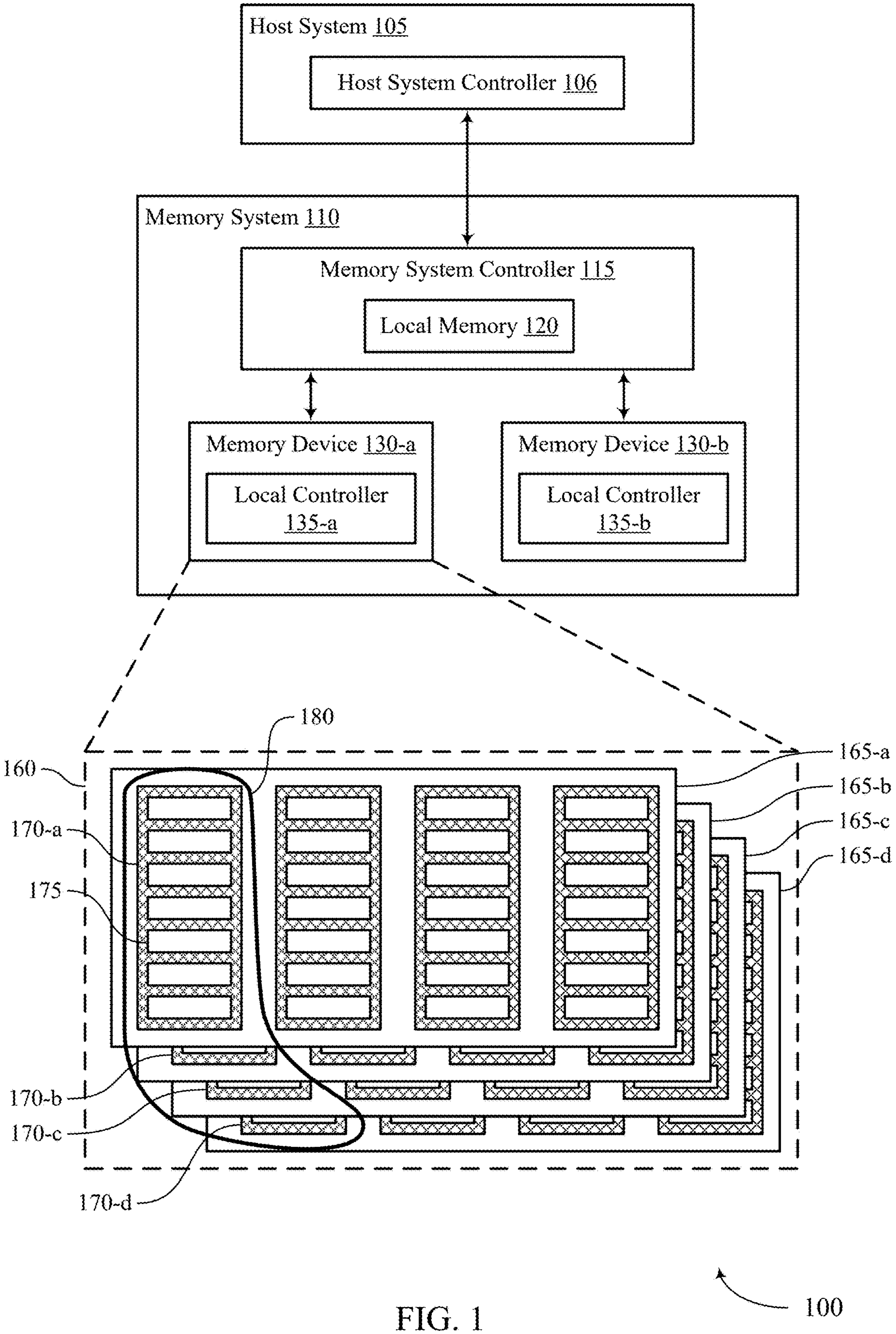
FIG. 1 shows an example of a system that supports garbage collection based on data characteristics in accordance with examples as disclosed herein.

In some examples, a memory system may include a set of virtual blocks associated with storing data. The memory system may perform maintenance operations (e.g., garbage collection operations) on the virtual blocks to move valid data to a destination block, and erase invalid or old data from the source block. In some instances, different regions of the virtual blocks may be associated with different levels of usage. In some cases, the memory system may receive one or more metrics from the host system that are indicative of a usage level for different regions. If, however, the host system is not enabled for or refrains from indicating such metrics, the memory system may not have a mechanism to identify such usage levels. If the memory system is unable to determine which regions correspond to a high level of usage, there may be an increase in invalid pages across the virtual blocks, which may increase the rate at which the memory system performs maintenance operations. Such increases in maintenance operations may reduce read and write performance of the memory system and increase write amplification.

A memory system may determine a usage level of one or more regions of virtual blocks by operating in accordance with the techniques descried herein. For example, the memory system may utilize an unused spare page area in a mapping table (e.g., a physical page table (PPT)) to store one or more counters associated with respective ranges of logical block addresses (LBAs) of the memory system. The memory system may track one or more metrics that are used to increment the counter. For example, the memory system may maintain a global version number (GVN) that is incremented each time a new virtual block is opened. The memory system may also maintain a virtual block version number (VBVN) that is set for a specific virtual block when it is opened. When a virtual block is accessed (e.g., when a range of LBAs associated with a virtual block is accessed), the memory system may determine a difference in the GVN and VBVN. If the difference satisfies a threshold, the counter may be incremented, which may be indicative of the usage level of the particular virtual block (e.g., of the respective range of LBAs).

During garbage collection for a virtual block, if the memory system determines that a given counter satisfies a threshold, the memory system may determine to transfer the data stored at the LBA group associated with the counter to a designated virtual block that is associated with more-frequently-accessed (e.g., hot) data. In other examples, if the memory system determines that a given counter does not satisfy a threshold, the memory system may transfer the data stored at the LBA group to a different designated virtual block that is associated with less-frequently-accessed (e.g., cold) data. As such, the memory system may use the values of the counters to determine the frequency at which LBAs may be assigned for garbage collection in response to how hot the associated data is. Such techniques may allow for the memory system to reduce a rate of garbage collection performed on LBAs that are being written to by the host system at relatively high rates. As such, a reduction in garbage collection procedures may decrease the write amplification as well as increase write and read performance for the memory system.

In addition to applicability in memory systems as described herein, techniques for garbage collection in response to data characteristics may be generally implemented to improve the sustainability of various electronic devices and systems. As the use of electronic devices has become even more widespread, the amount of energy used and harmful emissions associated with production of electronic devices and device operation has increased. Further, the amount of waste (e.g., electronic waste) associated with disposal of electronic devices may also pose environmental concerns. Implementing the techniques described herein may improve the impact related to electronic devices by reduce degradation of memory cells cause by write amplification at which may extend the life of electronic devices and thereby reducing electronic waste, among other benefits.

Features of the disclosure are illustrated and described in the context of systems, devices, and circuits. Features of the disclosure are further illustrated and described in the context of processes and flowcharts.

FIG. 1 shows an example of a system 100 that supports garbage collection based on data characteristics in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115. In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has not been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

A memory system 110 (e.g., a memory system controller 115) may determine a usage level of one or more regions of virtual blocks 180 by operating in accordance with the techniques descried herein. For example, the memory system 110 may utilize an unused spare page area in a mapping table (e.g., PPT) to store one or more counters associated with respective ranges of LBAs of the memory system 110. The memory system controller 115 may track one or more metrics that are used to increment the counter. For example, the memory system controller 115 may maintain a GVN that is incremented each time a new virtual block 180 is opened. The memory system may also maintain a VBVN that is set for a specific virtual block 180 when it is opened. When a virtual block 180 is accessed, the memory system controller 115 may determine a difference in the GVN and VBVN. If the difference satisfies a threshold, the counter may be incremented, which may be indicative of the usage level of the particular virtual block 180 (e.g., of the respective range of LBAs).

As such, during garbage collection for a virtual block 180, if the memory system controller 115 determines that a given counter satisfies a threshold, the memory system controller 115 may determine to transfer the data stored at the LBA group associated with the counter to a designated virtual block 180 that is associated with more-frequently-accessed (e.g., hot) data. In other examples, if the memory system controller 115 determines that a given counter does not satisfy a threshold, the memory system controller 115 may transfer the data stored at the LBA group to a different designated virtual block 180 that is associated with less-frequently-accessed (e.g., cold) data. As such, the memory system controller 115 may use the values of the counters to determine the frequency at which LBAs may be assigned for garbage collection in response to how hot the associated data is. Such techniques may allow for the memory system 110 to reduce a rate of garbage collection performed on LBAs that are being written to by the host system 105 at relatively high rates. As such, a reduction in garbage collection procedures may decrease the write amplification as well as increase write and read performance for the memory system 110.

The system 100 may include any quantity of non-transitory computer readable media that support garbage collection in response to data characteristics. For example, the host system 105 (e.g., a host system controller 106), the memory system 110 (e.g., a memory system controller 115), or a memory device 130 (e.g., a local controller 135), or any combination thereof may include or otherwise may access one or more non-transitory computer readable media storing instructions (e.g., firmware, logic, code) for performing the functions ascribed herein to the host system 105, the memory system 110, or the memory device 130, or combination thereof. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Figure 2:
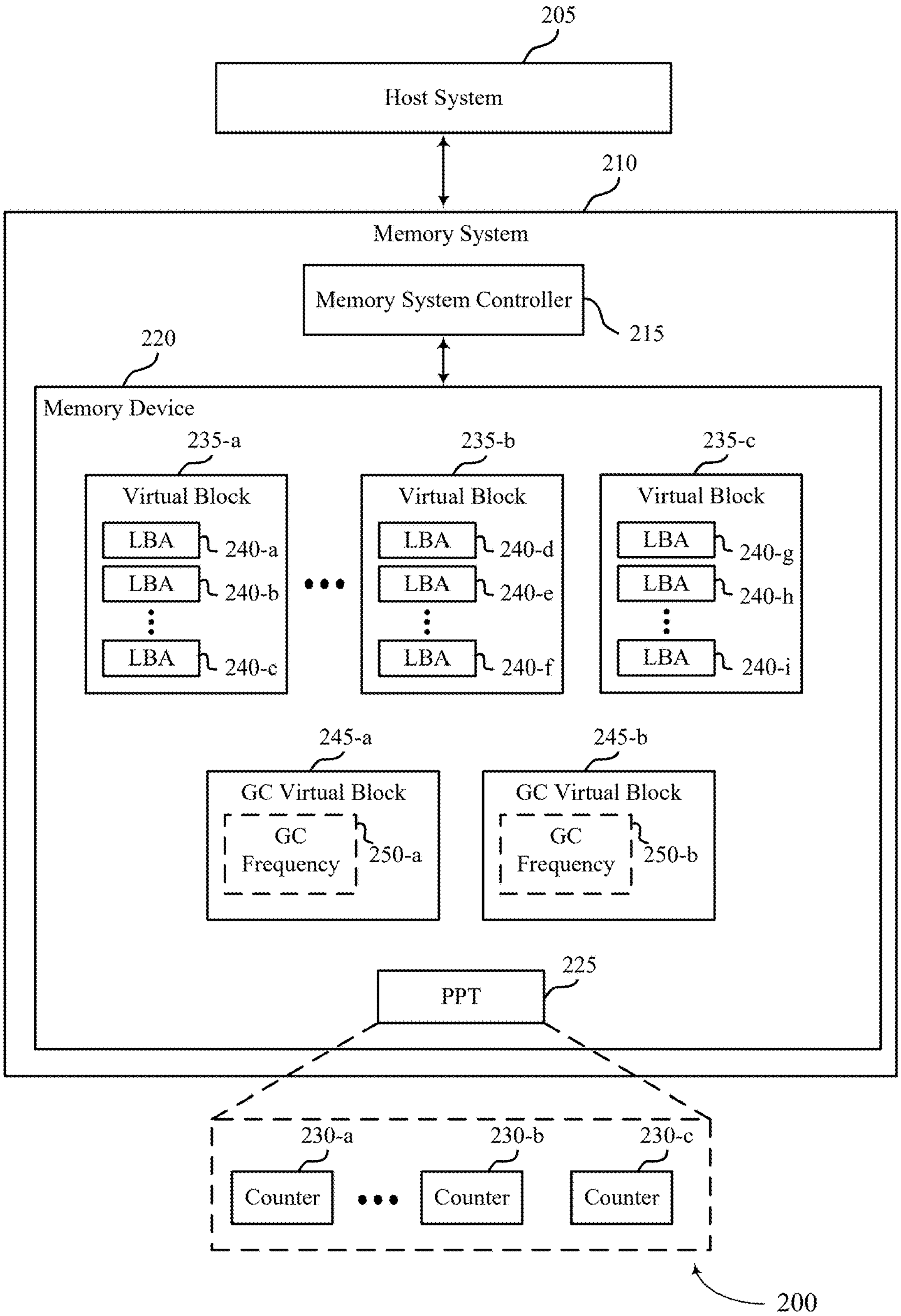
FIG. 2 shows an example of a system that supports garbage collection based on data characteristics in accordance with examples as disclosed herein.

FIG. 2 shows an example of a system 200 that supports garbage collection based on data characteristics in accordance with examples as disclosed herein. The system 200 may include a host system 205 and a memory system 210. In some instances, the memory system 210 may include a memory system controller 215 and a memory device 220, which may be examples of the corresponding devices described with respect to FIG. 1. In some examples, the memory system controller 215 may be configured to determine a level of usage of an LBA 240, and transfer the data associated with the LBA 240 to a given GC virtual block 245 in response to the level of usage, which may reduce garbage collection for data associated with high levels of usage. As such, a reduction in garbage collection procedures may decrease the write amplification as well as increase write and read performance for the system 100.

As illustrated in FIG. 2, the memory device 220 may include a set of virtual blocks 235 (e.g., virtual block 235-*a*, 235-*b*, and 235-*c*). In some examples, the memory device 220 may be a NAND device (e.g., a NAND flash device), such that each virtual block 235 may include or correspond to a set of memory cells. For instance, each virtual block 235 may be associated with a set of LBAs 240, that are associated with a set of memory cells. As illustrated in FIG. 2, virtual block 235-*a* may include a first respective set of LBAs 240 (e.g., LBA 240-*a*, 240-*b*, and 240-*c*), virtual block 235-*b* may include a second respective set of LBAs 240 (e.g., LBA 240-*d*, 240-*e*, and 240-*f*), and virtual block 235-*c* may include a third respective set of LBAs 240 (e.g., LBA 240-*g*, 240-*h*, and 240-*i*). While FIG. 2 illustrates three virtual blocks 235, it is understood that the memory device 220 may include any quantity of blocks 235 where each block 235 includes any quantity of LBAs 240.

In some examples, each LBA 240 of the virtual blocks 235 may correspond to a respective physical address of the memory device 220 (e.g., a respective PBA). A PBA may represent a physical location of the memory device 220. For instance, a PBA may point to (e.g., correspond or be associated with) an address of a page (e.g., a page 175) that includes a set of memory cells for a virtual block 235. As such, an LBA 240 may serve as an abstraction for the host system 205 to interact with the storage devices, while a PBA points to the actual location of a set of memory cells for storage of data. In some examples, accessing data stored to a PBA using the associated LBA 240 may utilize an entry or record that assigns a mapping between each LBA 240 and each PBA (e.g., an L2P table, such as a PPT). Additionally, or alternatively, a mapping between an LBA 240 and a PBA may change over time. For instance, the LBA 240-*a* may be mapped to a first PBA at a first time and at a second time, the memory system controller 215 may transfer the contents of the first PBA to a second PBA and map the LBA 240-*a* to the second PBA. As such, a contiguous set of LBAs 240 (e.g., LBA 240-*a* through 240-*c*) may map to a non-contiguous set of PBAs of the memory device 220.

In some examples, the memory system controller 215 may keep track of one or more metrics associated with the virtual blocks 235. For example, a GVN may correspond to a quantity of virtual blocks 235 that have been opened within the memory system 210, where the GVN may be incremented each time a virtual block 235 of the memory system 210 is opened. In some cases, a value that the GVN is incremented by may be based on a type of memory cells included in the opened virtual block 235. For instance, if memory system controller 215 opens a virtual block 235 of SLCs, the GVN may increment by one. If the memory system controller 215 opens a virtual block 235 of MLCs, the GVN may increment by two. If the memory system controller 215 opens a virtual block 235 of TLCs, the GVN may increment by three. If the memory system controller 215 opens a virtual block 235 of QLCs, the GVN may increment by four. Additionally, or alternatively, the GVN may not decrease. That is, the GVN may not decrease or be decremented if the memory system controller 215 closes one or more virtual blocks 235.

In some examples, each virtual block 235 may be assigned a VBVN that may correspond to the value of the GVN at the time a given virtual block 235 is opened. For example, the memory system 210 may receive a write command associated with opening virtual block 235-*c*, where the virtual block 235-*c* is opened in response to the memory system 210 receiving the write command. At the time the virtual block 235-*c* is opened, the memory system controller 215 may set the VBVN for virtual block 235-*c* to the current GVN. In some examples, the memory system controller 215 may then increment the GVN in accordance with the type of memory cells included in virtual block 235-*c* (e.g., SLC, MLC, TLC, and QCL). As such, the closer in value the VBVN is to the GVN, the more recently data may have been written to the associated virtual block 235 (e.g., is the data may be considered to be relatively hot).

In some examples, the memory system controller 215 may perform maintenance operations on the set of virtual blocks 235, such as the performance of a garbage collection procedure. For instance, garbage collection may refer to a set of media management operations that include, for example, selecting a virtual block 235 that contains valid and invalid data, selecting LBAs 240 (e.g., corresponding to respective pages 175) in the virtual block 235 that contain valid data, copying the valid data from the selected pages 175 to new locations (e.g., free pages 175 in another virtual block 235), marking the data in the previously selected LBAs 240 as invalid, and erasing the selected virtual block 235. As a result, the quantity of virtual blocks 235 that have been erased may be increased such that more virtual blocks 235 are available to store subsequent data (e.g., data subsequently received from the host system 205).

In some examples of garbage collection, the memory system controller 215 may perform garbage collection on a virtual block 235 if a VPC reaches a threshold. For instance, if a quantity of invalid pages of virtual block 235-*a* is greater than a VPC threshold, then the memory system controller 215 may perform a garbage collection procedure for the virtual block 235-*a*.

In some examples, various regions of LBAs 240 may correspond to respective levels of usage. For instance, the host system 205 may repeatedly write (e.g., overwrite) data to a first region of LBAs 240 such that during each overwrite, the current L2P mapping for the first regions of LBAs 240 may become invalidated, and the memory system controller 215 may update the L2P mapping. Thus, a region of LBAs 240 corresponding to a high level of overwrite may cause an increase in invalid pages in a virtual block 235, which may result in the memory system controller 215 performing garbage collection for the virtual block 235 at an increased frequency. In some cases, an increase in garbage collection for a given virtual block 235 may reduce read and write performance of the memory device 220 and increase the copying of valid data to from partially filled blocks which may increase write amplification. As such, it may be advantageous for the memory system controller 215 to perform garbage collection operations on regions of LBAs 240 associated with lower levels of usage and overwrites (e.g., data that is relatively cold) to reduce write amplification at the memory device 220.

In some examples, the memory system controller 215 may use one or more metrics to determine a level of usage for a region of LBAs 240 (e.g., determine a hotness of data). In one instance, the host system 205 and memory system 210 may use a stream identifier (SID) as a metric to identify the hotness of data. For example, an SID may be a unique identifier assigned to a sequence of related write operations corresponding to a first region of LBAs 240 that a host system 205 may transmit to the memory system 210. As such, the memory system 210 may use the SID to group together the sequence of related write operations to identify a level of usage for the first region of LBAs 240. If, however, the host system 205 is not enabled with SID indications or does not provide the SID to the memory system 210 during data transfer, the memory system 210 may not have a mechanism to identify a level of hotness corresponding to different regions of LBAs 240. As such, it may be advantageous for the memory system controller 215 to track the hotness of LBAs 240 independent of indications from the host system 205.

The memory system 210 may determine a usage level of the LBAs 240 (e.g., independent of information provided by the host system 205) by operating in accordance with the techniques descried herein. For example, the memory system controller 215 may utilize an unused spare page area in a PPT 225 to monitor information indicative of the hotness of the LBAs 240 of the virtual blocks 235. In some examples, the PPT 225 may be a data structure used by the memory system 210 to store mappings between virtual addresses (e.g., the LBAs 240) and physical addresses (e.g., the PBAs). For instance, each entry in the PPT 225 may include a respective PBA for each of a consecutive set of LBAs 240 (e.g., 1024 LBAs) where storing each LBA 240 may be associated with a quantity of space (e.g., 4 KB). In some examples, each page-offset of the PPT 225 may be allocated with a spare area to store PPT 225 information, where a portion of the spare area may be unutilized. In some examples, the PPT 225 may be an example of a PPT-3, which may be associated with a PPT-2 and a PPT-1.

In some examples, the memory system 210 may use the portion of the spare area that is unutilized to maintain one or more counters 230 to count a quantity of times that a region of LBAs 240 (e.g., an LBA group) have been written (e.g., overwritten) for each PPT 225 update. In some examples, the quantity of LBAs 240 included in an LBA group may be in response to a quantity of unused bytes included in the portion of the spare area of the PPT 225 that is unutilized. For instance, if there are seven free bytes unutilized in the spare area, and the PPT 225 is associated with 1024 LBAs, then the memory system 210 may configure seven 1-byte counters 230, where each 1-byte counter 230 is associated with approximately 146 consecutive LBAs. In another example, if there are 17 free bytes unutilized in the spare area, and the PPT 225 is associated with 1024 LBAs 240, then the memory system 210 may configure 17 1-byte counters 230, where each 1-byte counter 230 is associated with approximately 60 consecutive LBAs 240. As such, as the quantity of free bytes configured for the PPT 225 increases, the quantity of counters 230 configured by the memory system controller 215 may increase, thus increasing the granularity for the regions of LBAs 240.

As illustrated in FIG. 2, the memory system controller 215 may configure the PPT 225 with a quantity of counters 230 according to the techniques described herein, where each counter 230 corresponds to an LBA group of a quantity of consecutive LBAs 240. In some examples, the memory system controller 215 may determine whether to increment a counter 230 for an LBA group in response to a GVN and a VBVN associated with the LBA group. While FIG. 2 illustrates three counters (e.g., counter 230-*a*, 230-*b*, and 230-*c*), it is understood that the quantity of counters 230 configured by the memory system controller 215 is in accordance with the quantity of unutilized free space of the PPT 225.

Additionally, or alternatively, the PPT 225 may include information indicative of the VBVN associated with each LBA 240 included in the PPT 225. For example, the PPT 225 may include a virtual block number of each LBA 240 from which the memory system controller 215 may derive the VBVN associated with the LBA. For instance, the PPT 225 may include an indication that LBA 240-*b* is stored at virtual block 235-*a* (e.g., the virtual block number), and as such, the memory system controller 215 may determine that LBA 240-*a* is associated with the VBVN assigned to virtual block 235-*a* at the time that virtual block 235-*a* is opened.

In response to receiving a write command associated with an LBA, during the PPT 225 merge process, the memory system controller 215 may compare the GVN and the VBVN for the LBA 240 associated with the write command. In a first example, the memory system controller 215 may receive a write command associated with LBA 240-*b*, where LBA 240-*b* is associated with a first LBA group that corresponds to counter 230-*a*. In response to receiving the write command for LBA 240-*b*, the memory system controller 215 may determine the difference between the current GVN and the VBVN associated with virtual block 235-*a*. If the difference satisfies a configured version threshold (e.g., is less than a first threshold), then the memory system controller 215 may determine that the LBA group associated with LBA 240-*b* was recently written to and may increment the counter 230-*a* by a value of one (e.g., in the spare page of the PPT 225). In some cases, the configured version threshold may be an example of a first threshold.

If the difference between the GVN and the VBVN does not satisfy the version threshold (e.g., is greater than or equal to the version threshold), the memory system controller 215 may determine that the LBA group associated with LBA 240-*b* was not written to recently and may reset a value of the counter 230-*a* to one (e.g., irrespective of previous increments on the counter 230-*a*, since the data is not hot anymore). Further discussion of process for determining how to increment the value of the counters 230 is described herein, including with reference to FIG. 3.

In some examples, if a given counter 230 for an LBA group satisfies a count threshold (e.g., is equal to or above the second threshold), then the memory system controller 215 may determine that the LBA group associated with the given counter 230 is associated with hot data. If a given counter 230 for an LBA group does not satisfies a count threshold (e.g., is less than the count threshold), then the memory system controller 215 may determine that the LBA group associated with the given counter 230 is associated with cold data. In some cases, the count threshold may be an example of a second threshold.

In some examples, during a garbage collection procedure, the memory system controller 215 may transfer the data of a virtual block 235 to a given GC virtual block 245 in accordance with the whether the data for the virtual block 235 is determined as hot data or cold data. For example, during the garbage collection process in response to respective values of the counters 230 stored on the spare page of the PPT 225, if a first LBA group is considered to store relatively hot data (e.g., the associated counter 230 satisfies the counter 230 threshold), then the memory system controller 215 may transfer the data stored at the memory cells associated with the first LBA group to a GC virtual block 245-*a*. If a second LBA group is considered to store relatively cold data (e.g., the associated counter 230 does not satisfy the count threshold), then the memory system controller 215 may transfer the data stored at the memory cells associated with the second LBA group to a GC virtual block 245-*b*.

As illustrated in FIG. 2, the GC virtual block 245-*a* is associated with a first GC frequency 250-*a* and the GC virtual block 245-*b* is associated with a GC frequency 250-*b*. As described herein, hot data refers to LBAs 240 which may be frequently updated or overwritten by the host system 205. As such, the memory system controller 215 may select virtual blocks 235 including hot data for the garbage collection process at a lower frequency compared to virtual blocks 235 that store cold data (e.g., since the hot data LBAs 240 would be expected to be overwritten by the host system 205 at a higher frequency, rendering the garbage collection process done on these LBAs 240 to be less efficient). As such, the GC frequency 250-*a* may be less than the GC frequency 250-*b*, such that the memory system controller 215 may perform garbage collection for cold data more frequently than garbage collection of hot data. Further discussion of separating hot and cold data into GC virtual block 245-*a* and GC virtual block 245-*b* respectively is described herein, including with reference to FIG. 4.

By utilizing the unused spare page area in the PPT 225 to configure counters 230 associated with respective LBA groups, the memory system controller 215 may keep track of data hotness independently of the information provided by the host system 205. As such, the memory system controller 215 may use the values of the counters 230 to determine the frequency at which LBAs 240 may be assigned for garbage collection in response to how hot the associated data is. Such techniques may allow for the memory system controller 215 to reduce a rate of garbage collection performed on LBAs 240 that are being overwritten by the host system 205 at higher rates. As such, a reduction in garbage collection procedures may decrease the write amplification as well as increase write and read performance for the system 200.

Figure 3:
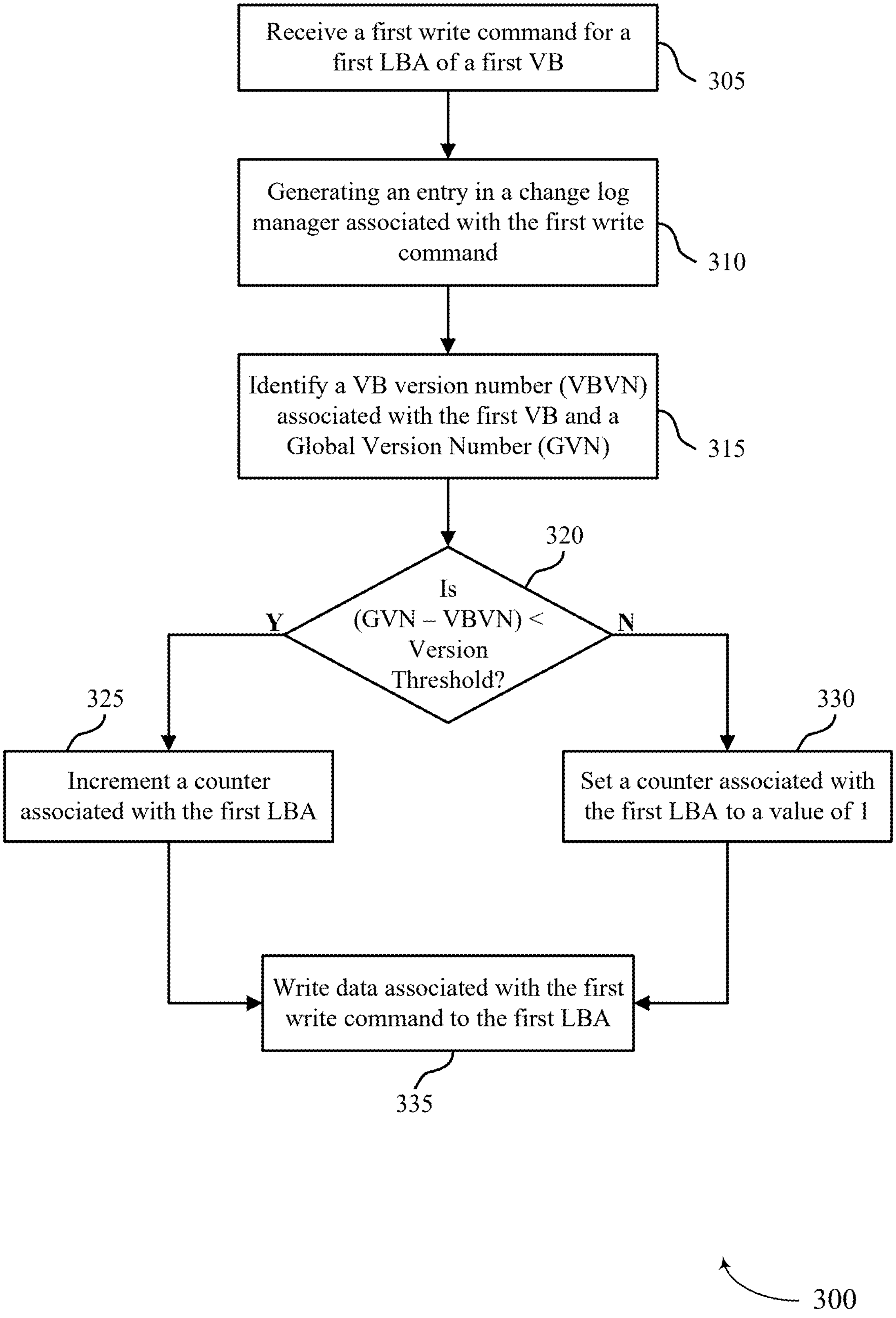
FIG. 3 shows an example of a process that supports garbage collection based on data characteristics in accordance with examples as disclosed herein.

FIG. 3 shows an example of a process 300 that supports garbage collection based on data characteristics in accordance with examples as disclosed herein. In some examples, the process 300 may be implemented by one or more aspects of systems 100 and 200. For instance, the process 300 may be implemented by a memory system 110 or 210 described with reference to FIGS. 1 and 2, respectively. In some examples, process 300 may correspond to one or more operations performed by the memory system to identify whether to increment a counter associated with a group of LBAs in response to a usage level (e.g., a hotness level) associated with the group of LBAs.

Aspects of the process 300 may be implemented by one or more controllers, among other components. Additionally, or alternatively, aspects of the process 300 may be implemented as instructions stored in one or more memories (e.g., firmware stored in one or more memories coupled with memory system 110 or 210). For example, the instructions, if executed by one or more controllers (e.g., the memory system controller 115 or 215), may cause the one or more controllers (or a device or a system) to perform the operations of the process 300.

At 305, a write command is received. For example, the memory system controller may receive, from the host system, a first write command associated with a first LBA of a first virtual block of the memory system. As described with reference to FIG. 2, the first virtual block may be associated with a first value indicating a VBVN of the first virtual block.

At 310, an entry of a change log manager is generated. For example, the memory system controller may generate an entry of the change log manager in response to receiving the write command. In some examples, the change log manager is a log that includes information indicative of changes made to data stored at the memory cells of the memory system. For instance, the information of the change log may include information associated with the write command such as the LBA the first write command is associated with.

At 315, a VBVN and a current GVN is identified. For example, the memory system controller may load, from a mapping table (e.g., the PPT 225, with reference to FIG. 2) information indicating that the first LBA is located at the first virtual block. In response to identifying that the first LBA is located at the first virtual block, the memory system controller may determine that the first LBA is associated with the VBVN of the first virtual block. Additionally, or alternatively, the memory system controller may access the current value of the GVN, which corresponds to a quantity of opened virtual blocks associated with the memory system (e.g., a quantity of virtual blocks within the memory system that have been opened since the GVN began being incremented).

At 320, a determination is made. For example, the memory system controller may determine whether a difference between the current GVN and the VBVN of the first virtual block is less than a first threshold (e.g., the version threshold, with reference to FIG. 2). In some examples, the memory system controller may adjust a value of a first counter within the mapping table of the memory system in response to receiving the write command and in response to whether a difference between the current GVN and the VBVN of the first virtual block satisfies the version threshold. In some examples, the first counter may be a counter 230, with reference to FIG. 2, and is associated with a range of LBAs that includes the first LBA (e.g., a first LBA group). As such, the mapping table may include a respective counter for multiple respective ranges of LBAs (e.g., respective LBA groups). In some examples, the version threshold may be configured at the memory system.

At 325, the first counter is incremented. For example, if the difference between the current GVN and the VBVN of the first virtual block is less than the version threshold, then the memory system controller may increment a counter associated with the first LBA. That is, adjusting the value of the first counter within the mapping table of the memory system may be in response to determining that the difference between the current GVN and the VBVN of the first virtual block satisfies the version threshold (e.g., is less than the version threshold).

At 330, the first counter is set or reset to an initial value. For example, if the difference between the current GVN and the VBVN of the first virtual block is greater than or equal to the version threshold, then the memory system controller may set the first counter associated with the first LBA to an initial value of one. That is, the first counter is set to the initial value of one in response to receiving the write command and the difference between the current GVN and the VBVN of the first virtual block failing to satisfy the version threshold (e.g., is greater than or equal to the version threshold).

At 335, data may be written. For example, the memory system controller may write data associated with the first write command to the first LBA in response to adjusting the first counter in accordance with determining whether the version threshold is satisfied.

As described with reference to FIG. 2, the first counter (e.g., an additional counter associated with respective LBA groups) may be stored at an unused spare page of the mapping table. As such, the memory system controller may increase the storage utilization of the mapping table. Additionally, the memory system controller may use the set of counters stored at the mapping table to track data hotness associated with the LBA groups, independently of information provided by the host system.

Figure 4:
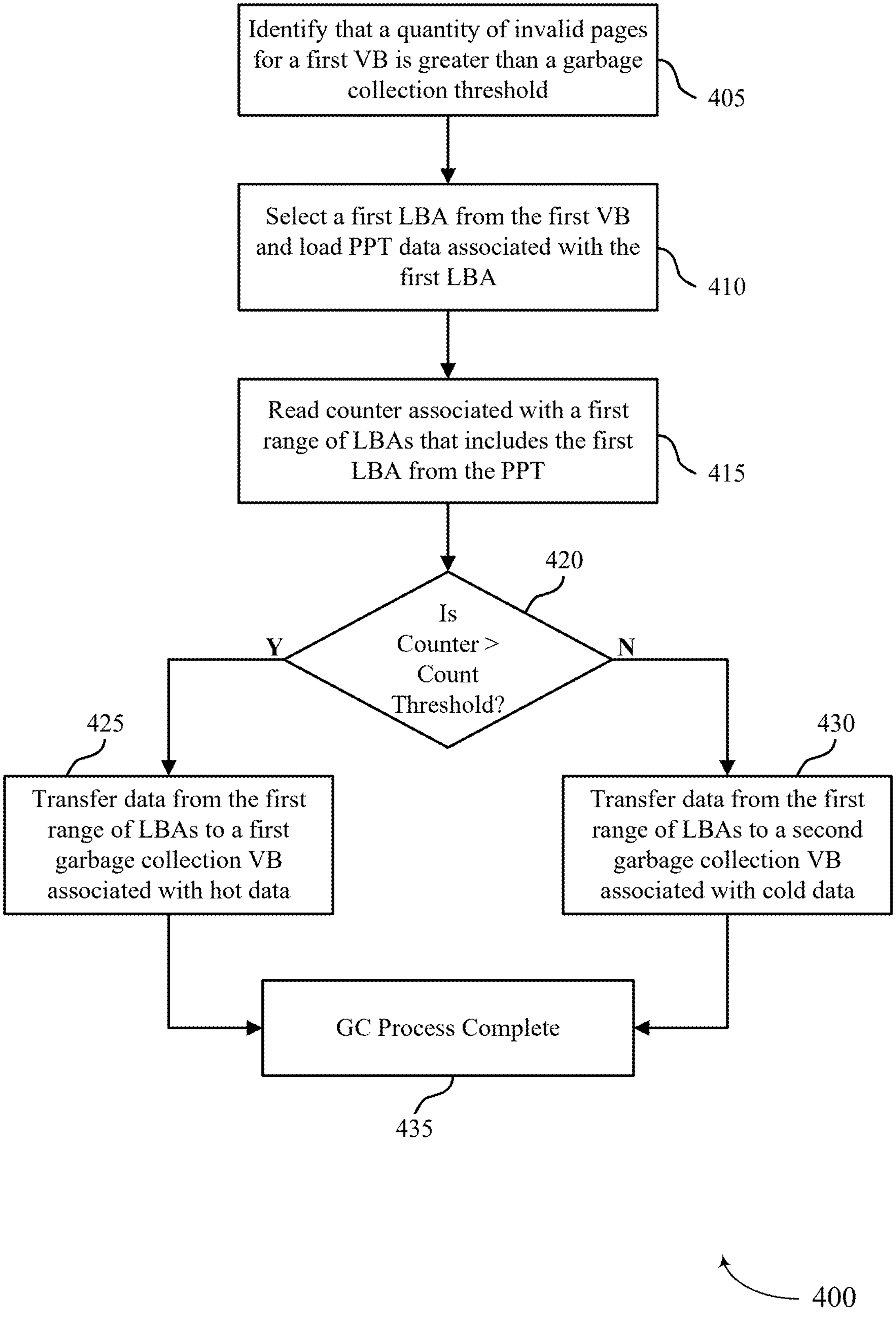
FIG. 4 shows an example of a process that supports garbage collection based on data characteristics in accordance with examples as disclosed herein.

FIG. 4 shows an example of a process 400 that supports garbage collection based on data characteristics in accordance with examples as disclosed herein. In some examples, the process 400 may be implemented by one or more aspects of system 100, system 200, and process 300. For instance, the process 400 may be implemented by a memory system 110 or 210 described with reference to FIGS. 1 and 2, respectively. In some examples, process 400 may correspond to one or more operations performed by the memory system to identify whether data stored at a given LBA group may be transferred to a first GC virtual block associated with hot data or to a second GC virtual block associated with cold data in accordance with a value of a counter associated with the given LBA group.

Aspects of the process 400 may be implemented by one or more controllers, among other components. Additionally, or alternatively, aspects of the process 400 may be implemented as instructions stored in one or more memories (e.g., firmware stored in one or more memories coupled with memory system 110 or 210). For example, the instructions, if executed by one or more controllers (e.g., the memory system controller 115 or 215), may cause the one or more controllers (or a device or a system) to perform the operations of the process 400.

At 405, a quantity of invalid pages of a first virtual block may be identified. For example, the memory system controller may identify that a quantity of invalid pages for the first virtual block satisfies a garbage collection threshold (e.g., is greater than or equal to the garbage collection threshold). In some examples, a page of a virtual block may be flagged as invalid to indicate for data stored at the page to be deleted via a garbage collection procedure.

At 410, a first LBA from the first virtual block may be selected. For example, the memory system controller may select the first LBA for the garbage collection operation in response to the quantity of invalid pages for the first virtual block satisfying the garbage collection threshold. In some examples, the memory system controller may load data stored at a mapping table (e.g., the PPT 225, with reference to FIG. 2) that is associated with the first LBA. In some examples, such loaded data stored at the mapping table may include a value of a counter associated with the first LBA. As described with reference to FIGS. 2 and 3, the counter may be a counter 230 and may be associated with a range of consecutive LBAs that includes the first LBA (e.g., a first LBA group).

At 415, the first counter is read. For example, the memory system controller may load and read, as part of the garbage collection procedure, the first counter from the mapping table of the memory system.

At 420, a determination is made. For example, the memory system controller may determine whether the value of the first counter satisfies a second threshold (e.g., is greater than or equal to a count threshold). In some examples, the value of the first counter may be in response to the techniques of counter adjustment as described with reference to FIGS. 2 and 3. In some examples, determining whether the value of the first counter satisfies the count threshold is in accordance with loading the value of the first counter.

At 425, data is transferred to a first GC virtual block. For example, if the memory system controller determines that the value of the first counter satisfies the count threshold (e.g., is greater than or equal to the count threshold), then the memory system controller may transfer data stored at the first LBA group (e.g., a first range of LBAs associated with the counter) to the first GC virtual block. In some examples, the first GC virtual block may be the GC virtual block 245-*a*, as described with reference to FIG. 2. That is, the first GC virtual block may be associated with data that is relatively hot (e.g., high levels of overwrite from the host system).

At 430, data is transferred to a second GC virtual block. For example, if the memory system controller determines that the value of the first counter does not satisfy the count threshold (e.g., is less than the count threshold), then the memory system controller may transfer data stored at the first LBA group (e.g., a first range of LBAs associated with the counter) to the second GC virtual block. In some examples, the second GC virtual block may be the GC virtual block 245-*b*, as described with reference to FIG. 2. That is, the second GC virtual block may be associated with data that is relatively cold (e.g., lower levels of overwrite from the host system).

At 435, the garbage collection procedure is completed. For example, the memory system controller may complete the garbage collection procedure based on transferring the contents of the data stored at the first virtual block to the first GC virtual block or the second GC virtual block.

In some examples, the first GC virtual block may be associated with a first frequency of access operations performed on a virtual block (e.g., relatively hot data) and the second GC virtual block is associated with a second frequency of access performed on a virtual block (e.g., relatively cold data), where the first frequency is greater than the second frequency. Additionally, or alternatively, the first GC virtual block may be associated with a third frequency of garbage collection operations (e.g., GC frequency 250-*a*, with reference to FIG. 2) and the fourth virtual block may be associated with a fourth frequency of garbage collection operations (e.g., GC frequency 250-*b*, with reference to FIG. 2). For example, the fourth frequency is greater than the third frequency.

By separating hot data and cold data into sperate GC virtual blocks, the memory system controller may reduce the rate at which garbage collection is performed. For instance, the first GC virtual block is associated with a lower GC frequency compared to the second GC virtual block, and as such, the memory system controller may reduce the rate of garbage collection performed on LBAs that are being overwritten by the host system 205 at higher rates. Such reductions in garbage collection procedures may decrease the write amplification as well as increase write and read performance for the memory system.

Figure 5:
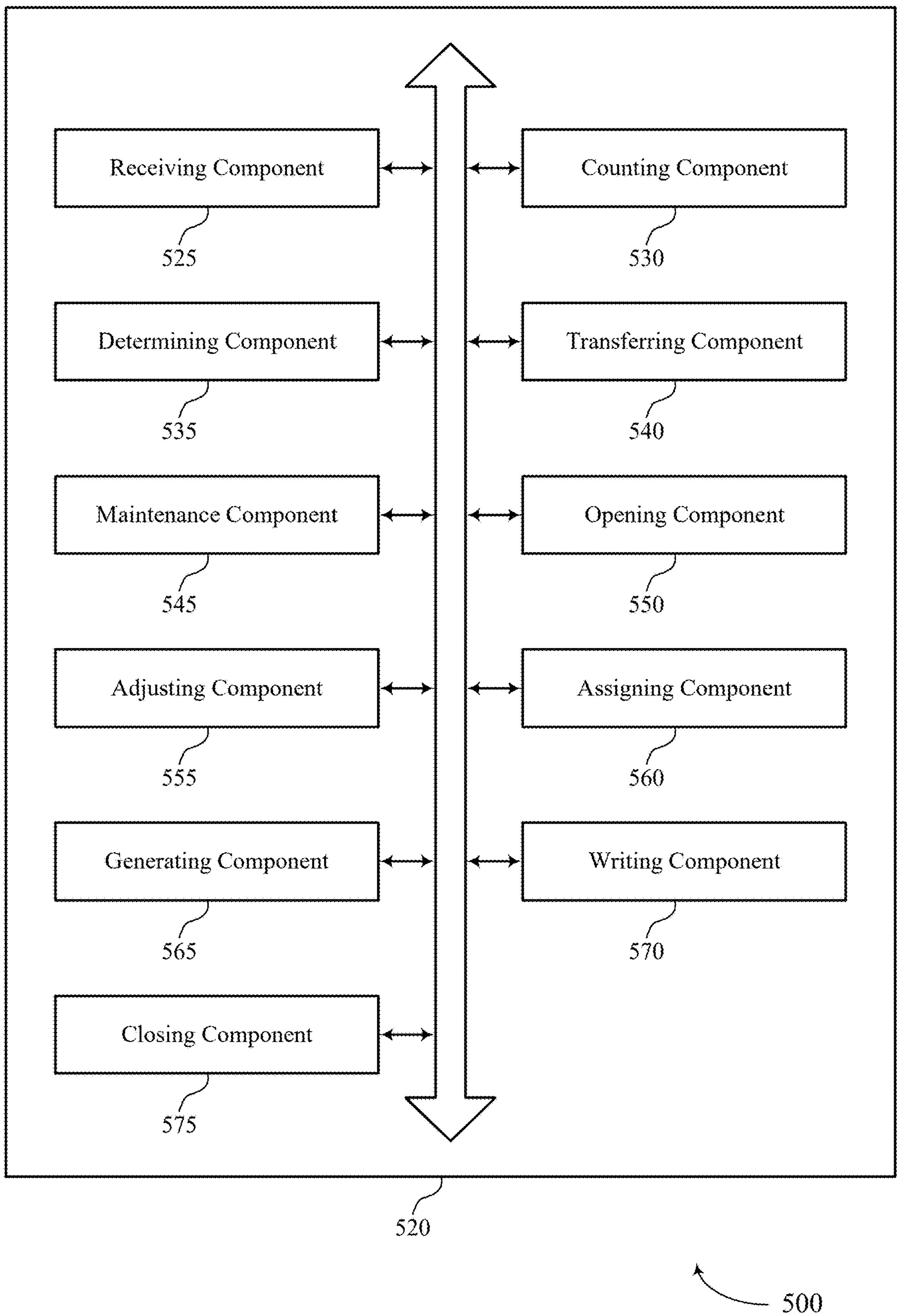
FIG. 5 shows a block diagram of a memory system that supports garbage collection based on data characteristics in accordance with examples as disclosed herein.

FIG. 5 shows a block diagram 500 of a memory system 520 that supports garbage collection in response to data characteristics in accordance with examples as disclosed herein. The memory system 520 may be an example of aspects of a memory system as described with reference to FIGS. 1 through 4. The memory system 520, or various components thereof, may be an example of means for performing various aspects of garbage collection in response to data characteristics as described herein. For example, the memory system 520 may include a receiving component 525, a counting component 530, a determining component 535, a transferring component 540, a maintenance component 545, an opening component 550, an adjusting component 555, an assigning component 560, a generating component 565, a writing component 570, a closing component 575, or any combination thereof. Each of these components, or components of subcomponents thereof (e.g., one or more processors, one or more memories), may communicate, directly or indirectly, with one another (e.g., via one or more buses).

The receiving component 525 may be configured as or otherwise support a means for receiving a write command associated with a first logical block address of a first virtual block of the memory system, where the first virtual block is associated with a first value indicating a version of the first virtual block. The counting component 530 may be configured as or otherwise support a means for adjusting a value of a first counter within a mapping table of the memory system in response to receiving the write command and on a difference between the first value and a second value satisfying a first threshold value, the second value indicating a quantity of opened virtual blocks within the memory system. The determining component 535 may be configured as or otherwise support a means for determining whether the value of the first counter satisfies a second threshold value in response to adjusting the value of the first counter. The transferring component 540 may be configured as or otherwise support a means for transferring, as part of a garbage collection operation, data associated with the first virtual block to a second virtual block in response to determining that the value of the first counter satisfies the second threshold value.

In some examples, the receiving component 525 may be configured as or otherwise support a means for receiving a second write command associated with a second logical block address of a third virtual block of the memory system, where the third virtual block is associated with a third value indicating a version of the third virtual block. In some examples, the counting component 530 may be configured as or otherwise support a means for adjusting a value of a second counter within the mapping table of the memory system in response to receiving the second write command and a difference between the third value and the second value satisfying the first threshold value. In some examples, the determining component 535 may be configured as or otherwise support a means for determining whether the value of the second counter satisfies the second threshold value in response to adjusting the value of the second counter. In some examples, the transferring component 540 may be configured as or otherwise support a means for transferring, as part of the garbage collection operation, data associated with the third virtual block to a fourth virtual block in response to determining that the value of the second counter does not satisfy the second threshold value.

In some examples, the second virtual block is associated with a first frequency of access operations performed on a virtual block and the fourth virtual block is associated with a second frequency of access performed on a virtual block. In some examples, the first frequency is greater than the second frequency.

In some examples, the second virtual block is associated with a third frequency of garbage collection operations and the fourth virtual block is associated with a fourth frequency of garbage collection operations. In some examples, the fourth frequency is greater than the third frequency.

In some examples, the second value is a global value that corresponds to a quantity of opened virtual blocks within the memory system and is adjusted each time a virtual block of the memory system is opened. In some examples, the first value is a local value that corresponds to the global value as of a time the first virtual block is opened.

In some examples, the receiving component 525 may be configured as or otherwise support a means for receiving a fourth write command associated with a fifth virtual block of the memory system. In some examples, the opening component 550 may be configured as or otherwise support a means for opening the fifth virtual block in response to receiving the fourth write command. In some examples, the adjusting component 555 may be configured as or otherwise support a means for adjusting the global value from the second value to a fourth value in response to opening the fifth virtual block. In some examples, the assigning component 560 may be configured as or otherwise support a means for assigning, to the fifth virtual block, a respective local value having the fourth value in response to opening the fifth virtual block.

In some examples, the closing component 575 may be configured as or otherwise support a means for closing the fifth virtual block, where the global value is maintained at the fourth value after closing the fifth virtual block.

In some examples, the receiving component 525 may be configured as or otherwise support a means for receiving a third write command associated with the first logical block address of the first virtual block of the memory system. In some examples, the counting component 530 may be configured as or otherwise support a means for setting the value of the first counter to an initial value in response to receiving the third write command and the difference between the first value and the second value failing to satisfy the first threshold value.

In some examples, the maintenance component 545 may be configured as or otherwise support a means for selecting the first logical block address for the garbage collection operation. In some examples, the maintenance component 545 may be configured as or otherwise support a means for loading, as part of the garbage collection operation, the value of the first counter from the mapping table of the memory system, where determining whether the value of the first counter satisfies the second threshold value is in response to loading the value of the first counter.

In some examples, the generating component 565 may be configured as or otherwise support a means for generating an entry in a change log in response to receiving the write command. In some examples, the writing component 570 may be configured as or otherwise support a means for writing data associated with the write command to the first logical block address of the first virtual block in response to generating the entry in the change log, where loading the value of the first counter from the mapping table is in response to writing the data to the first logical block address.

In some examples, the determining component 535 may be configured as or otherwise support a means for determining that the difference between the first value and the second value satisfies the first threshold value in response to receiving the write command, where adjusting the value of the first counter within the mapping table of the memory system is in response to determining that the difference between the first value and the second value satisfies the first threshold value.

In some examples, the first counter is associated with a range of logical block addresses that includes the first logical block address. In some examples, the mapping table includes a respective first counter for a plurality of ranges of logical block addresses.

In some examples, the described functionality of the memory system 520, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 520, or various components thereof, may be implemented at least in part by instructions (e.g., stored in memory, non-transitory computer-readable medium) executable by such at least one processor.

Figure 6:
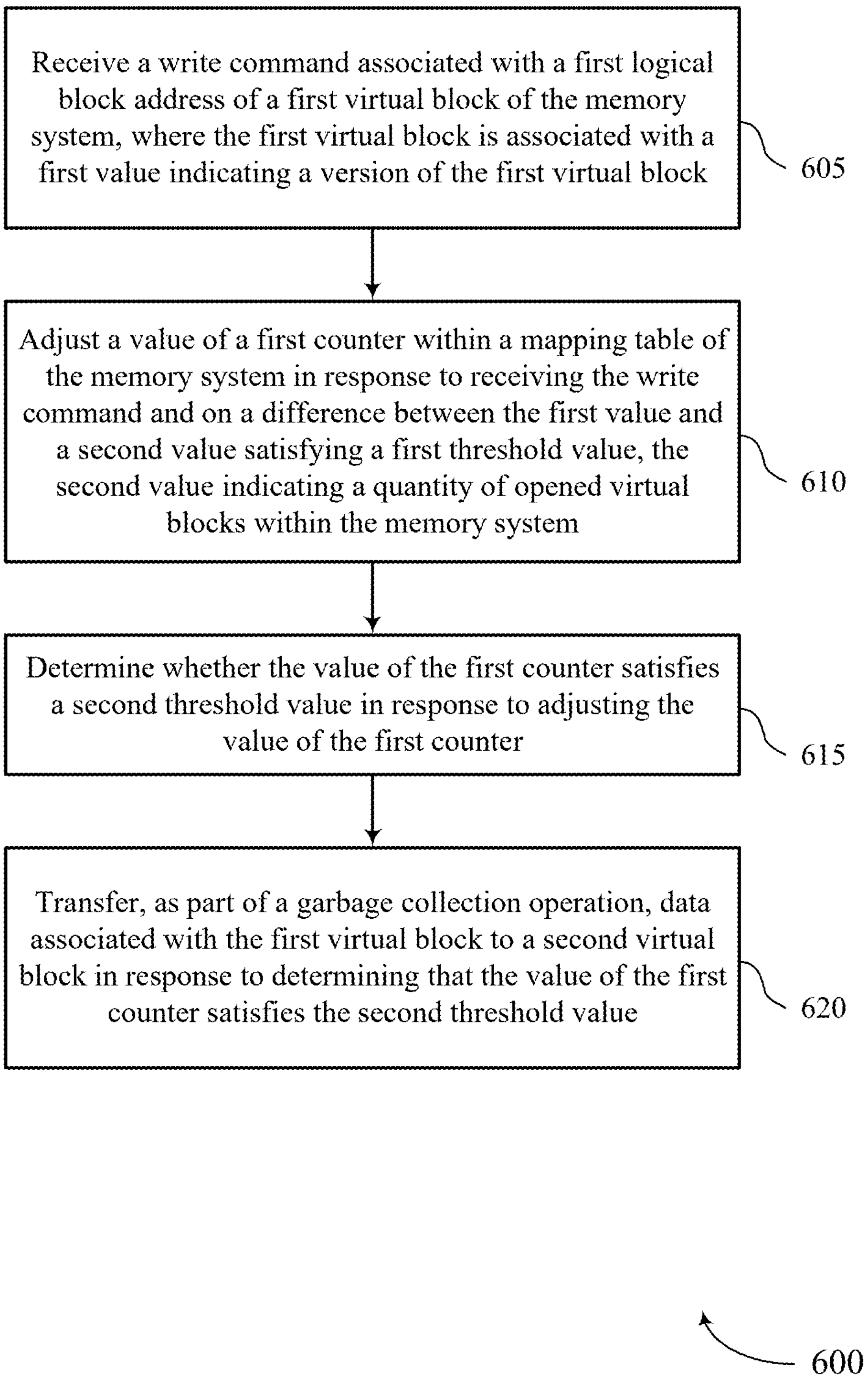
FIG. 6 shows a flowchart illustrating a method or methods that support garbage collection based on data characteristics in accordance with examples as disclosed herein.

FIG. 6 shows a flowchart illustrating a method 600 that supports garbage collection in response to data characteristics in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include receiving a write command associated with a first logical block address of a first virtual block of the memory system, where the first virtual block is associated with a first value indicating a version of the first virtual block. In some examples, aspects of the operations of 605 may be performed by a receiving component 525 as described with reference to FIG. 5.

At 610, the method may include adjusting a value of a first counter within a mapping table of the memory system in response to receiving the write command and on a difference between the first value and a second value satisfying a first threshold value, the second value indicating a quantity of opened virtual blocks within the memory system. In some examples, aspects of the operations of 610 may be performed by a counting component 530 as described with reference to FIG. 5.

At 615, the method may include determining whether the value of the first counter satisfies a second threshold value in response to adjusting the value of the first counter. In some examples, aspects of the operations of 615 may be performed by a determining component 535 as described with reference to FIG. 5.

At 620, the method may include transferring, as part of a garbage collection operation, data associated with the first virtual block to a second virtual block in response to determining that the value of the first counter satisfies the second threshold value. In some examples, aspects of the operations of 620 may be performed by a transferring component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a write command associated with a first logical block address of a first virtual block of the memory system, where the first virtual block is associated with a first value indicating a version of the first virtual block; adjusting a value of a first counter within a mapping table of the memory system in response to receiving the write command and on a difference between the first value and a second value satisfying a first threshold value, the second value indicating a quantity of opened virtual blocks within the memory system; determining whether the value of the first counter satisfies a second threshold value in response to adjusting the value of the first counter; and transferring, as part of a garbage collection operation, data associated with the first virtual block to a second virtual block in response to determining that the value of the first counter satisfies the second threshold value.

Aspect 2: The method, apparatus, or non-transitory computer-readable medium of aspect 1, further including operations, features, circuitry, logic, means, or instructions, or any combination thereof for receiving a second write command associated with a second logical block address of a third virtual block of the memory system, where the third virtual block is associated with a third value indicating a version of the third virtual block; adjusting a value of a second counter within the mapping table of the memory system in response to receiving the second write command and a difference between the third value and the second value satisfying the first threshold value; determining whether the value of the second counter satisfies the second threshold value in response to adjusting the value of the second counter; and transferring, as part of the garbage collection operation, data associated with the third virtual block to a fourth virtual block in response to determining that the value of the second counter does not satisfy the second threshold value.

Aspect 3: The method, apparatus, or non-transitory computer-readable medium of aspect 2, where the second virtual block is associated with a first frequency of access operations performed on a virtual block and the fourth virtual block is associated with a second frequency of access performed on a virtual block and the first frequency is greater than the second frequency.

Aspect 4: The method, apparatus, or non-transitory computer-readable medium of any of aspects 2 through 3, where the second virtual block is associated with a third frequency of garbage collection operations and the fourth virtual block is associated with a fourth frequency of garbage collection operations and the fourth frequency is greater than the third frequency.

Aspect 5: The method, apparatus, or non-transitory computer-readable medium of any of aspects 1 through 4, where the second value is a global value that corresponds to a quantity of opened virtual blocks within the memory system and is adjusted each time a virtual block of the memory system is opened and the first value is a local value that corresponds to the global value as of a time the first virtual block is opened.

Aspect 6: The method, apparatus, or non-transitory computer-readable medium of aspect 5, further including operations, features, circuitry, logic, means, or instructions, or any combination thereof for receiving a fourth write command associated with a fifth virtual block of the memory system; opening the fifth virtual block in response to receiving the fourth write command; adjusting the global value from the second value to a fourth value in response to opening the fifth virtual block; and assigning, to the fifth virtual block, a respective local value having the fourth value in response to opening the fifth virtual block.

Aspect 7: The method, apparatus, or non-transitory computer-readable medium of aspect 6, further including operations, features, circuitry, logic, means, or instructions, or any combination thereof for closing the fifth virtual block, where the global value is maintained at the fourth value after closing the fifth virtual block.

Aspect 8: The method, apparatus, or non-transitory computer-readable medium of any of aspects 1 through 7, further including operations, features, circuitry, logic, means, or instructions, or any combination thereof for receiving a third write command associated with the first logical block address of the first virtual block of the memory system and setting the value of the first counter to an initial value in response to receiving the third write command and the difference between the first value and the second value failing to satisfy the first threshold value.

Aspect 9: The method, apparatus, or non-transitory computer-readable medium of any of aspects 1 through 8, further including operations, features, circuitry, logic, means, or instructions, or any combination thereof for selecting the first logical block address for the garbage collection operation and loading, as part of the garbage collection operation, the value of the first counter from the mapping table of the memory system, where determining whether the value of the first counter satisfies the second threshold value is in response to loading the value of the first counter.

Aspect 10: The method, apparatus, or non-transitory computer-readable medium of aspect 9, further including operations, features, circuitry, logic, means, or instructions, or any combination thereof for generating an entry in a change log in response to receiving the write command and writing data associated with the write command to the first logical block address of the first virtual block in response to generating the entry in the change log, where loading the value of the first counter from the mapping table is in response to writing the data to the first logical block address.

Aspect 11: The method, apparatus, or non-transitory computer-readable medium of any of aspects 1 through 10, further including operations, features, circuitry, logic, means, or instructions, or any combination thereof for determining that the difference between the first value and the second value satisfies the first threshold value in response to receiving the write command, where adjusting the value of the first counter within the mapping table of the memory system is in response to determining that the difference between the first value and the second value satisfies the first threshold value.

Aspect 12: The method, apparatus, or non-transitory computer-readable medium of any of aspects 1 through 11, where the first counter is associated with a range of logical block addresses that includes the first logical block address and the mapping table includes a respective first counter for a plurality of ranges of logical block addresses.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit in response to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more memory devices; and processing circuitry coupled with the one or more memory devices and configured to cause the memory system to:

receive a write command associated with a first logical block address of a first virtual block of the memory system, wherein the first virtual block is associated with a first value indicating a version of the first virtual block;

adjust a value of a first counter within a mapping table of the memory system in response to receiving the write command and on a difference between the first value and a second value satisfying a first threshold value, the second value indicating a quantity of opened virtual blocks within the memory system;

determine whether the value of the first counter satisfies a second threshold value in response to adjusting the value of the first counter; and transfer, as part of a garbage collection operation, data associated with the first virtual block to a second virtual block in response to determining that the value of the first counter satisfies the second threshold value.

2. The memory system of claim 1, wherein the processing circuitry is further configured to cause the memory system to:

receive a second write command associated with a second logical block address of a third virtual block of the memory system, wherein the third virtual block is associated with a third value indicating a version of the third virtual block;

adjust a value of a second counter within the mapping table of the memory system in response to receiving the second write command and a difference between the third value and the second value satisfying the first threshold value;

determine whether the value of the second counter satisfies the second threshold value in response to adjusting the value of the second counter; and transfer, as part of the garbage collection operation, data associated with the third virtual block to a fourth virtual block in response to determining that the value of the second counter does not satisfy the second threshold value.

3. The memory system of claim 2, wherein the second virtual block is associated with a first frequency of access operations performed on a virtual block and the fourth virtual block is associated with a second frequency of access operations performed on a virtual block, and wherein the first frequency is greater than the second frequency.

4. The memory system of claim 2, wherein the second virtual block is associated with a third frequency of garbage collection operations and the fourth virtual block is associated with a fourth frequency of garbage collection operations, and wherein the fourth frequency is greater than the third frequency.

5. The memory system of claim 1, wherein:

the second value is a global value that corresponds to a quantity of opened virtual blocks within the memory system and is adjusted each time a virtual block of the memory system is opened; and the first value is a local value that corresponds to the global value as of a time the first virtual block is opened.

6. The memory system of claim 5, wherein the processing circuitry is further configured to cause the memory system to:

receive a fourth write command associated with a fifth virtual block of the memory system;

open the fifth virtual block in response to receiving the fourth write command;

adjust the global value from the second value to a fourth value in response to opening the fifth virtual block; and assign, to the fifth virtual block, a respective local value having the fourth value in response to opening the fifth virtual block.

7. The memory system of claim 6, wherein the processing circuitry is further configured to cause the memory system to:

close the fifth virtual block; and maintain the global value at the fourth value after closing the fifth virtual block.

8. The memory system of claim 1, wherein the processing circuitry is further configured to cause the memory system to:

receive a third write command associated with the first logical block address of the first virtual block of the memory system; and set the value of the first counter to an initial value in response to receiving the third write command and the difference between the first value and the second value failing to satisfy the first threshold value.

9. The memory system of claim 1, wherein the processing circuitry is further configured to cause the memory system to:

select the first logical block address for the garbage collection operation; and load, as part of the garbage collection operation, the value of the first counter from the mapping table of the memory system, wherein the processing circuitry is configured to cause the memory system to determine whether the value of the first counter satisfies the second threshold value in response to loading the value of the first counter.

10. The memory system of claim 9, wherein the processing circuitry is further configured to cause the memory system to:

generate an entry in a change log in response to receiving the write command; and write data associated with the write command to the first logical block address of the first virtual block in response to generating the entry in the change log, wherein the processing circuitry is configured to cause the memory system to load the value of the first counter from the mapping table in response to writing the data to the first logical block address.

11. The memory system of claim 1, wherein the processing circuitry is further configured to cause the memory system to:

determine that the difference between the first value and the second value satisfies the first threshold value in response to receiving the write command, wherein the processing circuitry is configured to cause the memory system to adjust the value of the first counter within the mapping table of the memory system in response to determining that the difference between the first value and the second value satisfies the first threshold value.

12. The memory system of claim 1, wherein:

the first counter is associated with a range of logical block addresses that comprises the first logical block address; and the mapping table comprises a respective first counter for a plurality of ranges of logical block addresses.

13. A non-transitory computer-readable medium storing code comprising instructions which, when executed by one or more processors of a memory system, cause the memory system to:

receive a write command associated with a first logical block address of a first virtual block of the memory system, wherein the first virtual block is associated with a first value indicating a version of the first virtual block;

adjust a value of a first counter within a mapping table of the memory system in response to receiving the write command and on a difference between the first value and a second value satisfying a first threshold value, the second value indicating a quantity of opened virtual blocks within the memory system;

determine whether the value of the first counter satisfies a second threshold value in response to adjusting the value of the first counter; and transfer, as part of a garbage collection operation, data associated with the first virtual block to a second virtual block in response to determining that the value of the first counter satisfies the second threshold value.

14. The non-transitory computer-readable medium of claim 13, wherein the instructions, when executed by the one or more processors of the memory system, further cause the memory system to:

receive a second write command associated with a second logical block address of a third virtual block of the memory system, wherein the third virtual block is associated with a third value indicating a version of the third virtual block;

adjust a value of a second counter within the mapping table of the memory system in response to receiving the second write command and a difference between the third value and the second value satisfying the first threshold value;

determine whether the value of the second counter satisfies the second threshold value in response to adjusting the value of the second counter; and transfer, as part of the garbage collection operation, data associated with the third virtual block to a fourth virtual block in response to determining that the value of the second counter does not satisfy the second threshold value.

15. The non-transitory computer-readable medium of claim 14, wherein the second virtual block is associated with a first frequency of access operations performed on a virtual block and the fourth virtual block is associated with a second frequency of access operations performed on a virtual block, and wherein the first frequency is greater than the second frequency.

16. The non-transitory computer-readable medium of claim 14, wherein the second virtual block is associated with a third frequency of garbage collection operations and the fourth virtual block is associated with a fourth frequency of garbage collection operations, and wherein the fourth frequency is greater than the third frequency.

17. The non-transitory computer-readable medium of claim 13, wherein:

the second value is a global value that corresponds to a quantity of opened virtual blocks within the memory system and is adjusted each time a virtual block of the memory system is opened; and the first value is a local value that corresponds to the global value as of a time the first virtual block is opened.

18. The non-transitory computer-readable medium of claim 17, wherein the instructions, when executed by the one or more processors of the memory system, further cause the memory system to:

receive a fourth write command associated with a fifth virtual block of the memory system;

open the fifth virtual block in response to receiving the fourth write command;

adjust the global value from the second value to a fourth value in response to opening the fifth virtual block; and assign, to the fifth virtual block, a respective local value having the fourth value in response to opening the fifth virtual block.

19. The non-transitory computer-readable medium of claim 18, wherein the instructions, when executed by the one or more processors of the memory system, further cause the memory system to:

close the fifth virtual block; and maintain the global value at the fourth value after closing the fifth virtual block.

20. The non-transitory computer-readable medium of claim 13, wherein the instructions, when executed by the one or more processors of the memory system, further cause the memory system to:

receive a third write command associated with the first logical block address of the first virtual block of the memory system; and set the value of the first counter to an initial value in response to receiving the third write command and the difference between the first value and the second value failing to satisfy the first threshold value.

21. The non-transitory computer-readable medium of claim 13, wherein the instructions, when executed by the one or more processors of the memory system, further cause the memory system to:

select the first logical block address for the garbage collection operation; and load, as part of the garbage collection operation, the value of the first counter from the mapping table of the memory system, wherein the instructions, when executed by the one or more processors of the memory system, cause the memory system to determine whether the value of the first counter satisfies the second threshold value in response to loading the value of the first counter.

22. A method by a memory system, comprising:

receiving a write command associated with a first logical block address of a first virtual block of the memory system, wherein the first virtual block is associated with a first value indicating a version of the first virtual block;

adjusting a value of a first counter within a mapping table of the memory system in response to receiving the write command and on a difference between the first value and a second value satisfying a first threshold value, the second value indicating a quantity of opened virtual blocks within the memory system;

determining whether the value of the first counter satisfies a second threshold value in response to adjusting the value of the first counter; and transferring, as part of a garbage collection operation, data associated with the first virtual block to a second virtual block in response to determining that the value of the first counter satisfies the second threshold value.

* * * * *